United States Patent [19]

Tanaka et al.

[11] Patent Number: 5,040,167
[45] Date of Patent: Aug. 13, 1991

[54] DISK CARTRIDGE

[75] Inventors: Yoshito Tanaka, Ibaraki; Takeo Sonobe, Toride, both of Japan

[73] Assignee: Hitachi Maxell, Ltd., Osaka, Japan

[21] Appl. No.: 333,022

[22] Filed: Apr. 4, 1989

[30] Foreign Application Priority Data

Apr. 4, 1988 [JP] Japan .............................. 63-44721[U]

[51] Int. Cl.$^5$ .............................................. G11B 7/26
[52] U.S. Cl. .................................. 369/291; 369/292; 360/133
[58] Field of Search ............................... 369/291-292, 369/272-273, 289, 75.1, 77.1, 77.2, 274; 360/131-133, 97.01, 97.04, 99.01-99.07

[56] References Cited

U.S. PATENT DOCUMENTS

| Re. 32,781 | 11/1988 | Takahashi | 360/133 |
|---|---|---|---|
| 4,443,874 | 4/1984 | Steenberg | 369/291 |
| 4,525,758 | 6/1985 | Nakagawa et al. | 360/133 |
| 4,550,354 | 10/1985 | Wakabayashi et al. | 360/133 |
| 4,608,681 | 8/1986 | Shiosaki | 369/77.2 |
| 4,641,212 | 2/1987 | Yokota et al. | 360/99.07 |
| 4,772,965 | 7/1988 | Kato et al. | 360/99.03 |
| 4,794,481 | 12/1988 | Suyama et al. | 360/99.06 |
| 4,860,136 | 8/1989 | Sasaki et al. | 360/99.05 |
| 4,899,238 | 2/1990 | Inoue et al. | 360/99.06 |

FOREIGN PATENT DOCUMENTS

| 0146656 | 7/1985 | European Pat. Off. . |
|---|---|---|
| 0201885 | 11/1986 | European Pat. Off. . |
| 61-211888 | 9/1986 | Japan . |
| 62-145586 | 6/1987 | Japan . |
| 2100494 | 12/1982 | United Kingdom . |
| 2142766 | 1/1985 | United Kingdom . |

Primary Examiner—William M. Shoop, Jr.
Assistant Examiner—David S. Martin
Attorney, Agent, or Firm—Birch, Stewart, Kolasch & Birch

[57] ABSTRACT

A disk cartridge accommodating a disk-type recording medium and adapted to be used on a recording/read-out apparatus having at least an upper head and lower head for accessing to the upper and lower surfaces of the disk, the disk cartridge comprising an upper case member and a lower case member which are assembled together to form a case defining therein an internal space for accommodating the disk, head windows formed in the upper and lower case members opposing each other so as to allow the heads to make access to the disk therethrough, the head windows extending in a predetermined radial direction of the disk, a recess formed by recessing the surface of each case member at a region extending between one longitudinal end of the head window and the edge of the case member closest to the longitudinal end of the head window, and a shutter capable of sliding on the case in the widthwise direction of the head windows so as to open/close the recesses and the head windows, the head window formed in the upper case member and the head window formed in the lower case member having different widths.

4 Claims, 13 Drawing Sheets

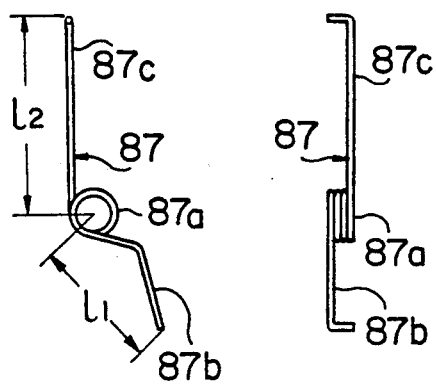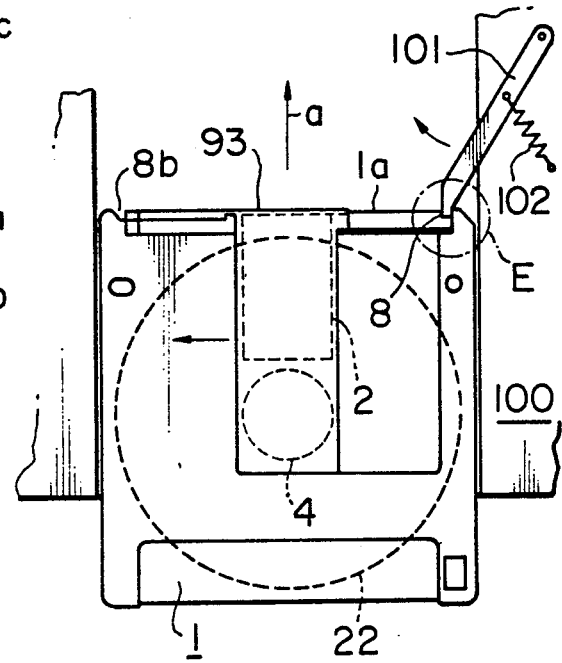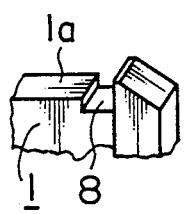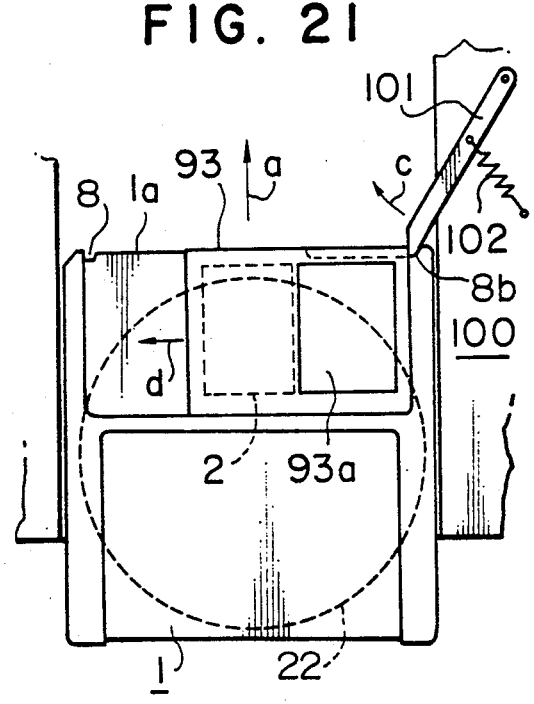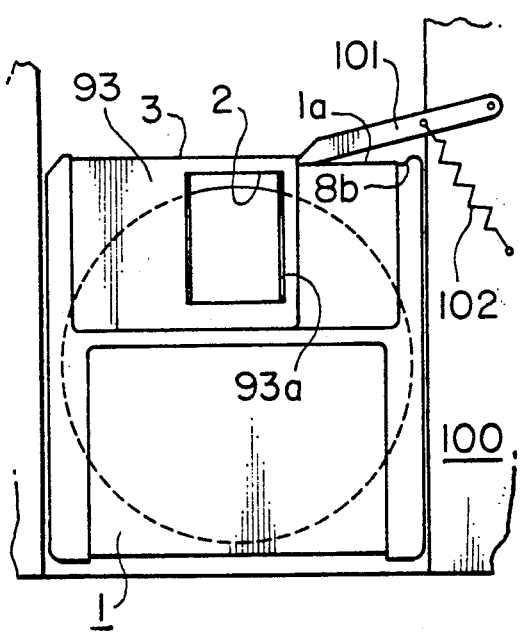

DISK CARTRIDGE

BACKGROUND OF THE INVENTION

1. Field of the Invention

The present invention relates to a disk cartridge suitable for use with a disk-type recording medium, in particular a magneto-optical disk.

2. Description of the Related Art

Presently, various disk-type recording mediums are used such as magneto-optical disks, optical disks and magnetic disks. These disk-type recording mediums (referred to simply as 'disks' hereinafter) are usually encased in cartridge cases for the purpose of facilitating handling of the disks in mounting or loading on demounting or unloading from disk drives, and preventing contamination of disks with dust and greasy matter on fingers.

In general, a disk cartridge has a case composed of an upper case member and a lower case member which are integrated with each other so as to define an internal space which receives a disk without restriction or constraint. In order to enable the disk in the state held in the cartridge to be mounted on a disk drive, the case is provided with an opening or openings for allowing a spindle and heads of the disk drive to be received therethrough into the case.

For instance, a disk cartridge disclosed in the specification of the U.S. Pat. No. 4,443,874 has opposing openings formed in the upper and lower case members such as to extend in the radial direction of the disk to expose a portion of the disk including the central hole of the disk. The disk cartridge also has a detachable closure member capable of closing the openings. When the disk is not used, the openings in the upper and lower case members are closed by the closure member. When the disk is to be used, the user detaches the closure member from the cartridge to expose a portion of the disk through the openings and then inserts the cartridge into the disk drive. In consequence, the spindle extends to the disk through the opening and heads are allowed to oppose the exposed portions of both surfaces of the disk.

The specification of the U.S. Pat. No. 4,608,681 discloses another disk cartridge having a case which is automatically divided or separated into a front part and rear part upon insertion into a disk drive so as to expose a portion of the disk which extends in the radial direction of the disk over a predetermined width. In consequence, the central hole of the disk receives the spindle and the heads are brought to positions where they face the surfaces of the disk.

The disk cartridge of the type disclosed in the specification of the U.S. Pat. No. 4,443,874 is disadvantageous in that it requires a troublesome work for detaching and attaching the closure member each time the disk cartridge is put to use and stored. In addition, the disk tends to be contaminated by dust and greasy matter when the closure member has been removed to enable the insertion of the cartridge or when the user has forgotten to set the closure member after the use of the disk.

In the disk cartridge of the type disclosed in the specification of the U.S. Pat. No. 4,608,681, the disk drive is required to have an internal space of a size greater than that of the disk cartridge, in order to provide a room large enough to enable the automatic separation of the front and rear parts of the case. In addition, the construction of the disk cartridge is undesirably rendered complicated and the disk drive is required to have suitable means for automatically separating the front and rear parts of the case in response to the insertion of the disk cartridge.

A disk cartridge is also known in which openings or head windows are formed in upper and lower case members and a spindle hole (hub hole) is formed in the lower case, the head windows, and hub holes being capable of being closed and opened by shutters slidable on the upper and lower cases.

In a typical example of the disk cartridge of this type, as shown in FIG. 29, a head window 15 is formed within a recess 16 formed in the surface of a case member 10, and a shutter 13 is slidable in the recess 16. Such a disk cartridge is disclosed in Japanese Patent Unexamined Publication No. 62-145586. When the above-mentioned case member 10 is the upper case member, this case member is assembled together with a lower case member so as to define an internal space which accommodates a disk 12. The lower case member is also provided with a recess and a head window similar to those of the recess 16 and the head window 15 in the upper case member. A shutter 13 has a substantially U-shaped cross-section and is slidably mounted in such a manner as to sandwich the surfaces of the recesses 16 in the upper and lower case members. The recesses 16 in the upper and lower case members are provided with guide grooves 17 which are formed in the vicinity of the sides 11 of the case members 10 in parallel therewith. Claws 13a provided on the inner surfaces of the shutter 13 engage with the guide grooves 17 such as to allow the shutter 13 to slide in parallel with the side 11. The shutter 13 is biased by a spring 13 so that the head windows 15 are normally closed, as illustrated. When this disk cartridge is inserted into the disk drive, an actuating means operates to drive the shutter 13 to the right as viewed in the Figure against the force of the spring 18, thereby allowing the head windows 15 to open.

The recesses 16 are intended to limit the range of movement of the shutter 13. When the head windows 15 are closed, the shutter 13 contacts at its one side (left side) with the corresponding side (left side) of the recesses 16, whereas, when the head windows are opened, the other side (right side) of the shutter 13 is stopped by the corresponding side (right side) of the recess 16.

The shutter should have a length and a width large enough to cover the head windows. In the arrangement shown in FIG. 29, the shutter 13 is made to have a width considerably greater than the width of the head window 15 at its end adjacent to the side 11, while the other end of the shutter 13 has a width which is slightly greater than the width of the head window 15, so that the shutter 13 generally has a substantially right-angled triangle form. The guide grooves 17 do not extend to the region intermediate between the head window 15 and the side 11, while the claws 13a are provided rather adjacent to the right end of the shutter 13.

Japanese Patent Unexamined Publication No. 61-211888 discloses a shutter which has a substantially rectangular form with a width somewhat greater than that of the head window 15. This type of shutter is applicable to the arrangement of FIG. 29, provided that the recess 16 has a correspondingly rectangular form and that the guide grooves 17 are extended into the region intermediate between the side 11 and the head window 15.

In some of disk cartridges which incorporate a shutter of the type mentioned above, the shutter is designed to cover also the hub hole for receiving the spindle. In such a disk cartridge, the shutter is required to have a substantial width because the hub hole has a considerably large diameter so that the stroke of the shutter is increased correspondingly. Since the shutter width is increased, the width of the head window also tends to be increased in order to facilitate the access of the head to the disk.

The shutter is usually biased by a spring member so as to normally close the head windows and the hub hole. If an abnormal external force produced, for example, by a touch of a finger is exerted on the shutter, the shutter can easily move against the force of the spring member. Since the shutter width is only slightly greater than the width of the head window, the head window is opened even by a slight movement of the shutter. If the head window width is determined to be slightly greater than the width which is actually required, the head window is opened even by a very small movement of the shutter, thus enhancing the risk for the disk to be contaminated by dust or greasy matter, with the result that the reliability is impaired undesirably.

In order to avoid undesirable contact and interference between the heads and the disk cartridge during insertion into the disk drive, the surfaces of the case are recessed in the form of steps at portions between the side 11 of the case and the respective head windows 15 to reduce the thickness of the cartridge at this portion. FIG. 30 shows a known cartridge which makes use of a rectangular shutter 13 and which has steps or recesses 19 in the surface portions between the side 11 and the head windows 15. It is impossible to form the guide grooves 17 in this recess 19. When this recess 19 is provided in a disk cartridge which has a large window width (length in the direction parallel to the side 11), one of the claws 13a provided inside the shutter 16 undesirably floats in the recess 19 so that the left portion of the shutter loses the support thereby allowing the shutter 13 to play or rattle.

In general, the disk cartridge with the head windows closed by the shutter 13 is taken out of the disk drive and, hence, has a large risk to be subjected to abnormal external force. The shutter 13 without support has a very small mechanical strength and tends to be damaged by an impact.

SUMMARY OF THE INVENTION

Accordingly, an object of the present invention is to provide a disk cartridge which is improved to diminish play or rattle of the shutter while enhancing the mechanical strength of the shutter, so as to attain a high reliability of the device of this type, thereby overcoming the above-described problems of the prior art.

To this end, according to the present invention, there is provided a disk cartridge in which the windows formed in the upper and lower case members have different widths, such that one of the windows has a smaller width than the other. The reduced width of one of the windows correspondingly decreases the chance for dust and greasy matter to enter into the disk cartridge. The shutter can be stably supported despite the presence of the steps or recesses formed between the windows and the case, because both widthwise ends of the shutter are always held by both sides of the narrower head window. Thus, the mechanical strength of the shutter mechanism is enhanced. A further stabilization of the shutter is attainable by providing guide grooves along both sides of the narrower head window.

The above and other objects, features and advantages of the present invention will become clear from the following description of the preferred embodiments when the same is read in conjunction with the accompanying drawings.

BRIEF DESCRIPTION OF THE DRAWINGS

FIG. 17 is a plan view of a reset spring used in the third embodiment;

FIG. 18 is a side elevational view of a reset spring used in the third embodiment;

FIGS. 19, 21 and 22 are illustrating the construction of a fourth embodiment of the disk cartridge in accordance with the present invention;

FIG. 20 is an illustration of an essential portion of the disk case shown in FIG. 22;

DESCRIPTION OF THE PREFERRED EMBODIMENTS

Some of the preferred embodiments of the present invention will be described hereinunder with reference to the accompanying drawings.

Figure 1:
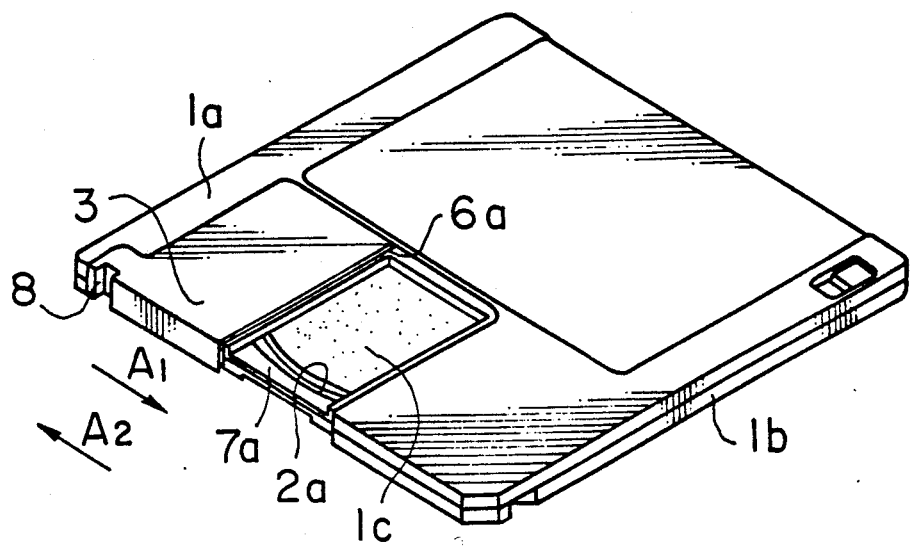
FIG. 1 is a perspective view of a first embodiment of the disk cartridge as viewed from the upper side of an upper case member of the disk cartridge.
Figure 2:
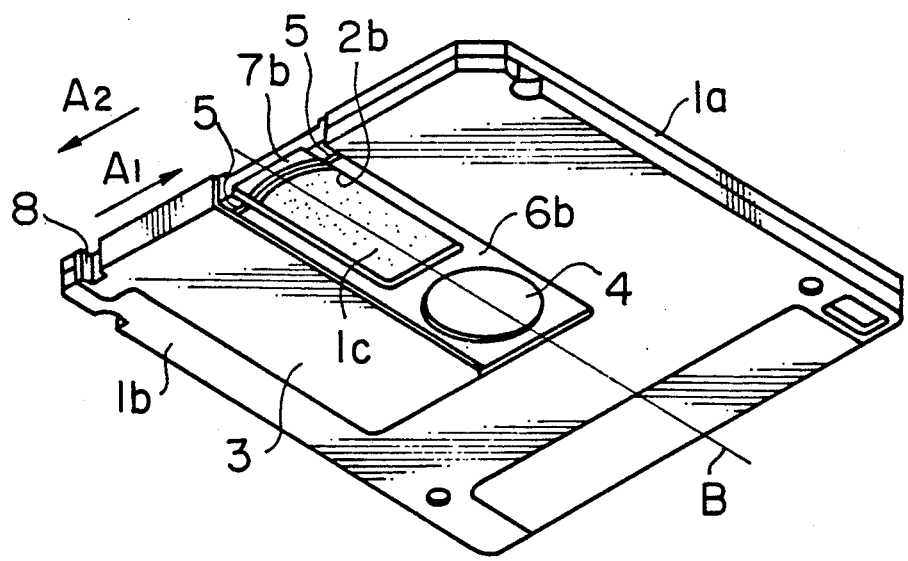
FIG. 2 is a perspective view of the embodiment of the disk cartridge as viewed from the lower side of a lower case member of the disk cartridge.

FIGS. 1 and 2 are perspective views of a first embodiment of the disk cartridge in accordance with the present invention as viewed from the upper side of an upper case member and the lower side of a lower case member, respectively. The disk cartridge has an upper case member 1a and a lower case member 1b which have head windows 2a and 2b formed therein. The disk cartridge also has a shutter 3 for selectively closing the head windows 2a, 2b. A reference numeral "4" denotes a hub hole, "5" denotes guide grooves, "6a", and "6b" denote recesses, "7a", and "7b" denote hollows and 8 denotes a notch.

Referring to FIGS. 1 and 2, the upper case member 1a and the lower case member 1b are made integral with each other to form a case which has an internal space for accommodating a disk 1 without substantial restraint. The recesses 6a, 6b formed in the upper case member 1a and the lower case member 1b are adapted for limiting the stroke of the shutter 3. The head window 2a formed in the upper case member 1a is positioned within the area of the recess 6a, while the head window 2b and the hub hole 4 formed in the lower case member 1b are located within the area of the recess 6b. The hub hole 4 is positioned at the center of the lower case member 1b and is adapted to allow a spindle of a disk drive to reach the disk 1c. The shutter 3 has a substantially U-shaped cross-section and is mounted in such a manner as to sandwich the recesses 6a and 6b. The shutter 3 is slidable on both surfaces of the case as indicated by arrows A1 and A2.

Each of the head windows 2a and 2b is formed in symmetry with respect to a line B which passes the center of the hub hole 4 and which is perpendicular to the side of the lower case member 1b to which the shutter 3 is attached.

The length of each head window 2a, 2b as measured in the direction perpendicular to the arrows A1 and A2 is determined to be greater than the radial length of the record region of the disk 1c mounted in the disk cartridge. The recess 6a formed in the upper case member 1a is determined substantially in conformity with the length of the head window 2a but the recess 6b formed in the lower case member 1b has a greater length so as to extend over the hub hole 4.

The portion of the upper surface of the upper case member 1a between the side to which the shutter 3 is attached and the head window 2a is stepped or further recessed so as to provided a hollow 7a of a level lower than the level of the recess 6 so as to avoid a head of the disk drive to contact with the disk cartridge when the disk cartridge is inserted into the disk drive. Similarly, the lower surface of the lower case member 1b has a hollow 7b which is further recessed from the recess 6b in the region between the head window 2b and the shutter 3.

The head window 2b formed in the lower case member 1b has a width which is smaller than the width of the head window 2a formed in the upper case member 1a. The head window 2a having the greater width is formed near the end of the recess 6a such that one side of the head window 2a substantially coincides with one side of the recess 6a. In other words, the recess 6a is designed such that its one side substantially coincides with one side of the head window 2a.

The shutter 3 has a width which is somewhat greater than the width of the head window 2a. The shutter 3 is movable between a first position where it allows the head window 2a to fully open as illustrated and a second position where it completely closes the head window 2a. The aforementioned arrow A1 indicates the direction of movement of the shutter 3 from the first position to the second position. It will be understood that the stroke of the shutter 3 can be minimized by locating the head window 2a with respect to the recess 6a such that their sides substantially coincide with each other, as described above.

The head window 2b formed in the lower case member 1b and having a smaller width than the upper head window 2a is formed in symmetry with respect to the line B as is the case of the upper head window 2a. In addition, the portion of the shutter 3 which slides along the recess 6b in the lower case member 1b has the same width as the portion of the same which slides along the recess 6a in the upper case member 1a. Thus, the recess 6b has portions which are located on both widthwise ends of the head window 2b.

When the shutter 3 is moved from the position of FIG. 1 as indicated by the arrow A1 to the second position where is completely closes the head window 2a, the shutter 3 contacts one side of the recess 6b and completely closes the head window 2b and the hub hole 4. In this state, the shutter 3 is supported by the portions of the bottom of the recess 6b which are on both widthwise ends of thee head window 2b.

Figure 3:
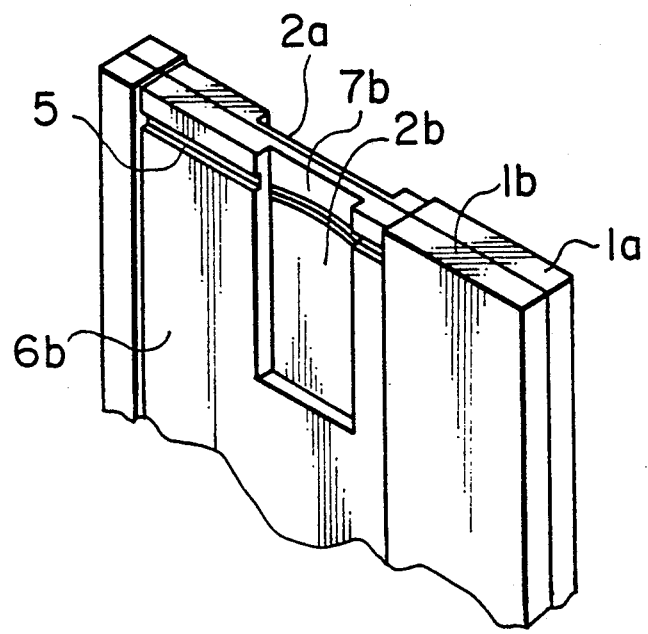
FIG. 3 is an illustration of shutter guide grooves formed in the lower case member shown in FIG. 2.

The shutter guide grooves 5 are formed in parallel with the arrows A1, A2 in the recess 6b having the narrower head window 2b, because such an arrangement enables one guide groove 5 to be formed at each side of the hollow 7b. FIG. 3 shows the guide grooves 5 for the shutter 3, formed in the bottom of the recess 6b in the lower case member 1b.

Figure 4:
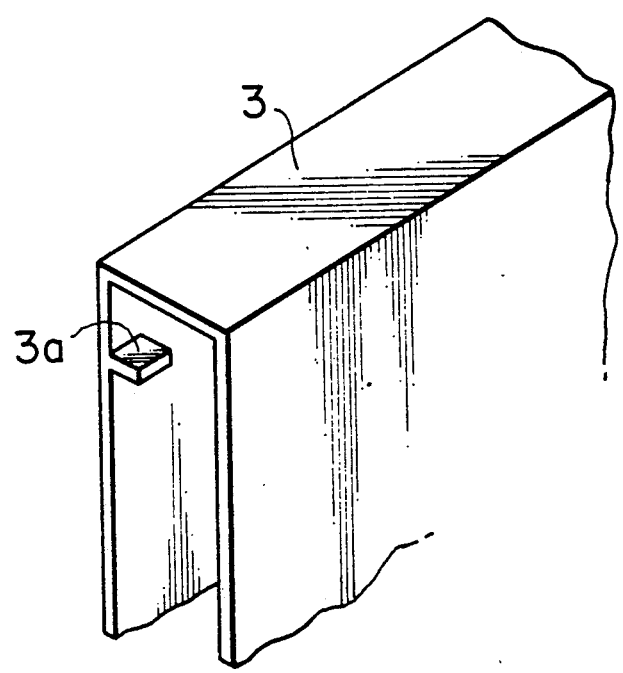
FIG. 4 is a fragmentary enlarged oblique view of a shutter used in the first embodiment.

AS shown in FIG. 4, claws 3a are provided on the inner surface of the shutter 3 facing the recess 6b. The claws 3a slidably engage with the guide grooves 5 formed in the bottom of the recess 6b shown in FIG. 3. At least two such claws 3a are provided and one of such claws 3a is provided on the right end of the shutter 3 as viewed in FIG. 2. Therefore, when the shutter 3 has been moved in the direction of the arrow A1 to the second position where it closes the head window 2b, the claw 3a (see FIG. 4) provided on the right end of the shutter 3 engages with the guide groove 5 which is formed in the portion of the recess 6b on the right side of the hollow 7b.

In this state, the other claw or claws 3a engage with the guide groove 5 which is formed in the portion of the recess 6b on the left side of the hollow 7b. Thus, the claws 3a provided on the shutter 3 engage with the guide grooves 5 at both sides of the hollow 7b, so that the shutter 3 can be stably held without any play or rattle, thus offering a greater mechanical strength of the shutter system.

Figure 29:
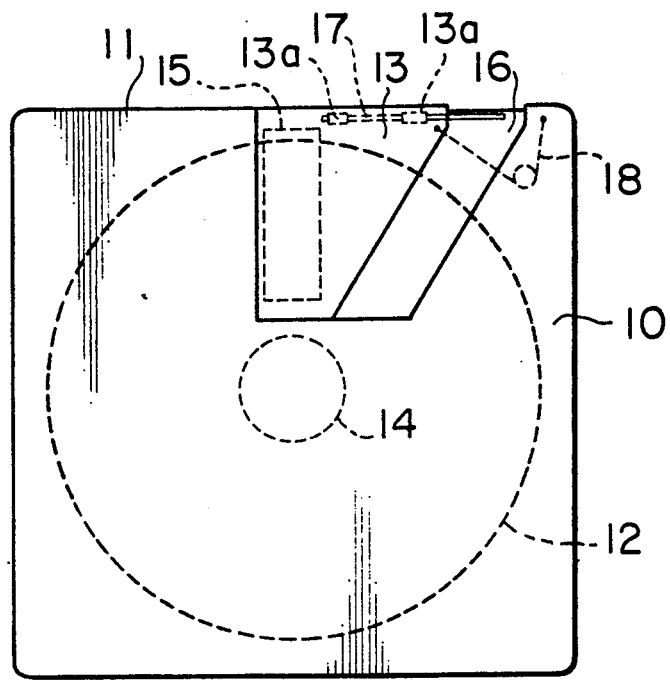
FIGS. 29 and 30 are plan views of conventional cartridges.
Figure 30:
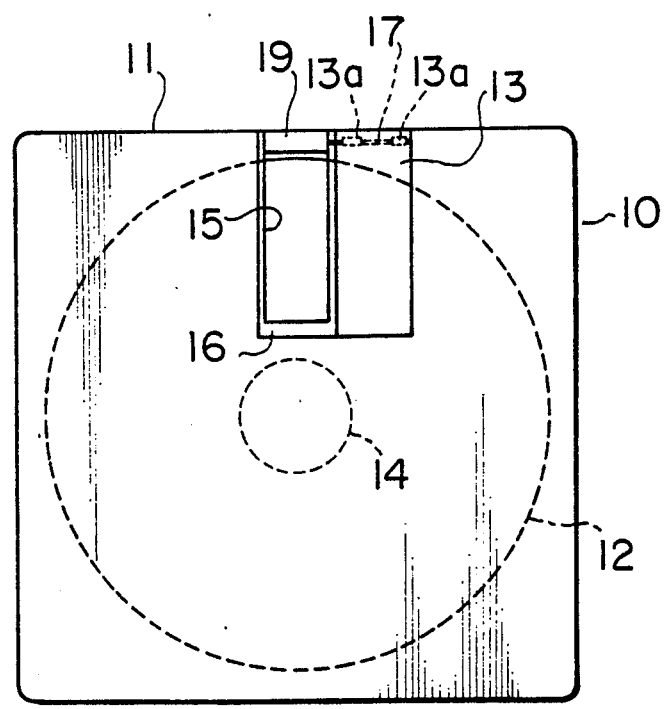

Referring to FIGS. 1 and 2, the shutter 3 is always urged in the direction of the arrow A1 by a spring (not shown), as is the case of the known cartridge explained before in connection with FIG. 29, so that the head windows 2a, 2b and the hub hole 4 are normally closed by the shutter 3.

When this disk cartridge is inserted into a disk drive, a lever (not shown) is brought into engagement with the notch 8 in the course of the insertion. In consequence, the lever acts to drive the shutter 3 against the urging force of the spring member, as indicated by a narrow A2, thus allowing the head windows 2a, 2b and the hub hole 4 to open. The disk 1c may be a magnetic disk, optical disk or the like.

Figure 4A:
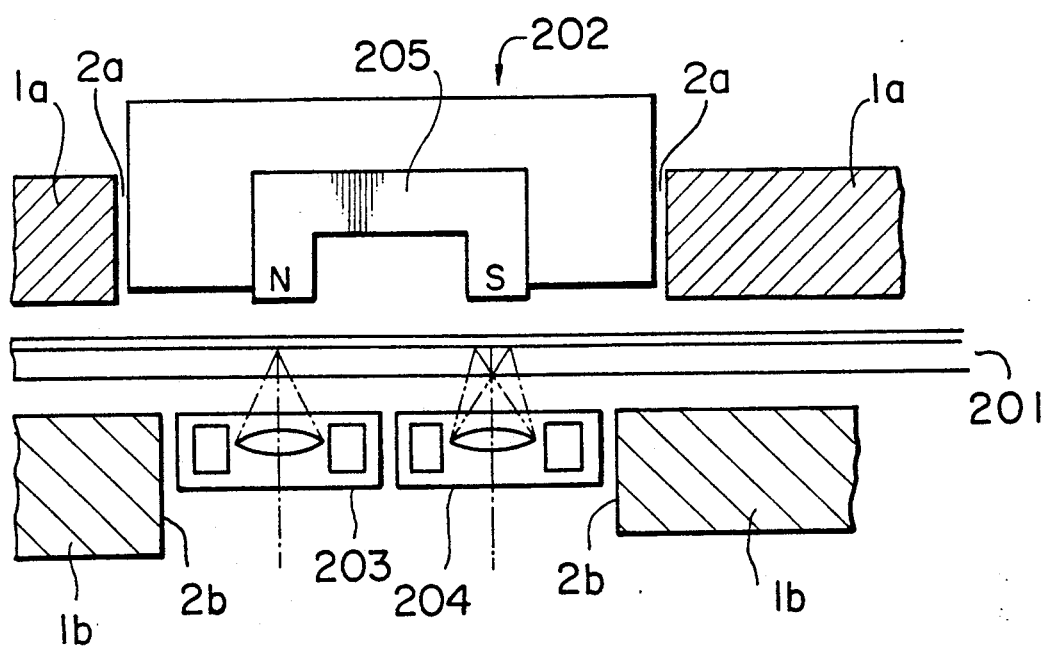
FIG. 4A is an illustration of a magnetooptical recording device which can operate with the first embodiment of the disk cartridge.

When the disk 1c accommodated in the disk cartridge is a magneto-opical disk 201, a magnetic head 202 of a magneto-optical recording device 200 is allowed to make access to the disk 201 through the wider head window 2a, as shown in FIG. 4A, while an optical head of the device 200 approaches the disk through the narrower window 2b. Although in the device 200 shown in FIG. 4A the magnetic head 202 is composed of a permanent magnet 205, this is only an example and the magnetic head 202 may comprise an electromagnet. The use of the separate heads, i.e., an erasure head 203 and a recording/reading head 204, in the device of FIG. 4A, is not essential. For instance, it is possible to use a single head having all the required functions or three or more heads having the respective functions.

As will be understood from the foregoing description, in this embodiment of the present invention, the risk for the head window 2b to undesirably open is reduced, even when the shutter is unexpectedly moved when the disk cartridge is not in use, by virtue of the fact that the head window 2b has a reduced width, whereby contamination of the disk by dust and greasy matter which may be introduced into the cartridge is suppressed. In addition, the shutter 3 can be stably supported and the mechanical strength of the shutter system can be enhanced.

A second embodiment of the disk cartridge of the present invention will now be described.

Figure 5:
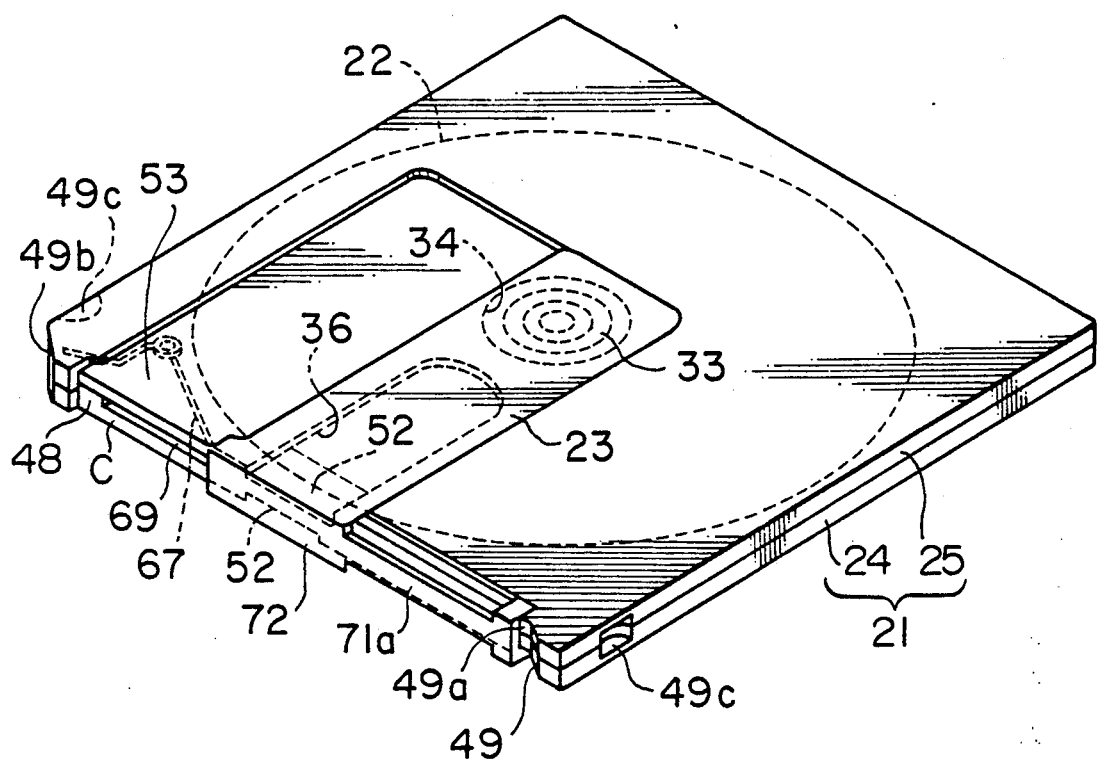
FIG. 5 is a perspective view of a second embodiment of the disk cartridge in accordance with the present invention.

Referring to FIG. 5, the second embodiment of the disk cartridge of the present invention is composed mainly of a cartridge case 21 made of plastic, a disk-type recording medium 22 rotatably mounted in the cartridge case 21, and a shutter 23 slidably mounted on the front end portion of the cartridge case 21.

The cartridge case 21 is composed of an upper case member 25 and a lower case member 24 each having a shallow pan-like form. These case members 24 and 25 are assembled together to form the cartridge case 21 so as to define an internal space for accommodating the disk 22 and other parts.

Figure 6:
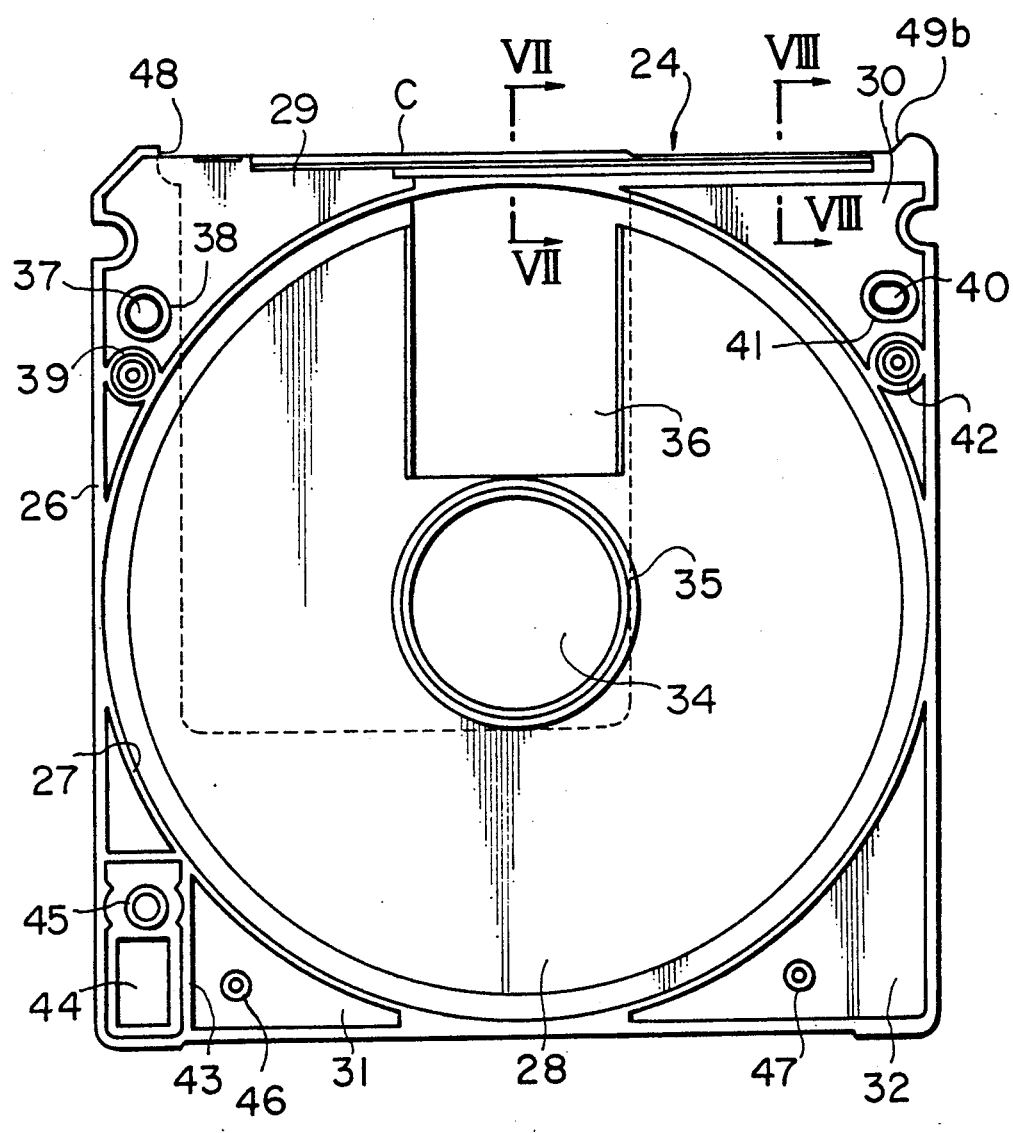
FIG. 6 is a plan view showing the inner surface of a lower case member of the second embodiment of the disk cartridge.

As will be seen from FIG. 6, a joint wall 26 is formed on the inner surface of the lower case 24 so as to extend along the outer peripheral edge excepting the front edge which is on the leading side, as viewed in the direction of insertion. A partitioning wall having a substantially circular form and a height substantially the same as the joint wall 26 is formed on the inner surface of the lower case member 24 such as to contact the inner side of the joint wall 26. These walls separate a space 28 for receiving the disk from other spaces 29, 30, 31 and 32.

A spindle hole 34 for receiving a spindle of a disk drive is formed in the center of the portion of the case corresponding to the space 28 for accommodating the disk. An annular rib 35 having a height smaller than that of the joint wall 26 is formed to surround the spindle hole 34. A head window 36 for allowing a recording/read-out head of the disk drive to make access to the disk 22 is formed at a position between the spindle hole 34 and the front end C, in each of the upper and lower case members. The head window 36 formed in the upper case member 25 and the head window 36 formed in the lower case member 24 have different widths. Namely, one of these head windows has a width smaller than that of the other.

Among the four spaces mentioned above, the left front space 29 has a circular first reference hole 37 which is surrounded by a projection 38 having a height greater than those of the joint wall 26 and the partitioning wall 27. A first welding boss 39 having a height greater than those of the joint wall 26 and the partitioning wall 27 is formed near the rear end of the projection 38.

A second reference hole 40, having an oval form, is provided in the right front space 30. The second reference hole 40 is surrounded by a projection 41 which has the same height as the projection 38. A second welding boss 42 of the same height as the first welding boss 39 is provided near the rear end of the projection 41.

A reinforcement rib 43 of the same height as the joint wall 26 and the partitioning wall 27 is provided to protrude in the left rear space 31. A rectangular write protector hole 44 is formed near the rear end of a region which is surrounded by the reinforcement rib 43 and the joint wall 26. A third welding boss 45 of the same height as the first and second welding bosses 39, 42 is provided near the front end side of this region. An annular first welding projection 46 taller than the joint wall 26 and the partitioning wall 27 is provided outside a region defined by the joint wall 26 and the reinforcement rib 43 within the space 31.

A second welding projection 47 of the same height as the first welding projection 46 is disposed in the right rear space 32.

An internal mounting step 48 for mounting the front end of a later-mentioned shutter 23 is formed in the front edge C. An actuator step 49 for contact with the end of a shutter actuating arm in the disk drive is formed near one end (right end in FIG. 5) of the front edge C.

Figure 7:
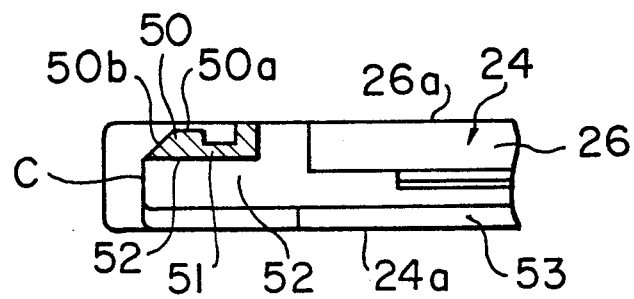
FIG. 7 is a sectional view taken along the line VII—VII of FIG. 6.
Figure 8:
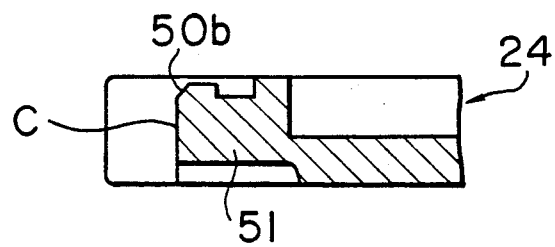
FIG. 8 is a sectional view taken along the line VIII—VIII of FIG. 6.

A straight hook shaped guide rail 51 having an engaging claw 50 is formed on the inner side of the internal mounting step 48 and the actuator step 49 substantially along the entire length of the front edge C, as will be seen from FIGS. 6, 7 and 8. As will be seen from FIGS. 7 and 8, the inner surface 50a of the engaging claw 50 is recessed from the end surface 26a of the joint wall 26 so that, when the lower case member 24 is assembled together with the upper case member 25, a slit for slidably holding the shutter 23 is formed between the shutter guide rail 51 and a shutter guide rail 66 formed in the upper case member 25. A slant surface 50b formed on the front side of the retaining claw 50 facilitates the mounting of the shutter 23.

The portion of the lower case member 24 between the head window 36 and the front edge C is recessed from the surface 24a of the lower case 24 so as to provide a connection recess 52 which facilitates passage of the recording/read-out head during insertion of the disk cartridge into the disk drive.

A shallow recess 53 is formed in the outer surface of the lower case 24 for movably mounting the panel portion of the shutter.

Figure 9:
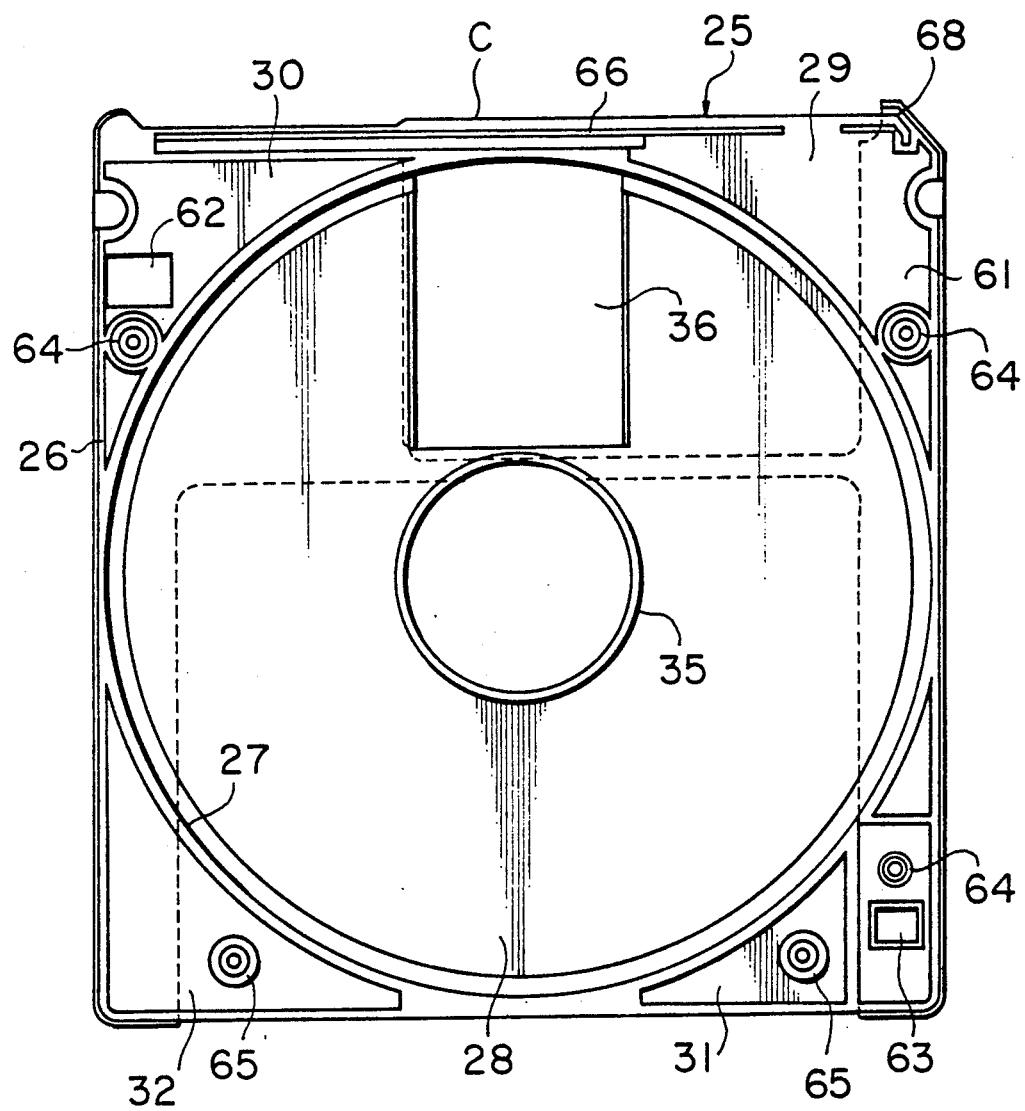
FIG. 9 is a plan view showing the inner surface of an upper case member of the disk cartridge shown in FIG. 5.

As shown in FIG. 9, the upper case member 25 has a construction and dimensions which are materially the same at those of the lower case member 24. In this Figure, the same reference numerals are used to denote the same parts or members as those appearing in FIGS. 6 to 9, and a detailed description is omitted in regard to these parts.

Thus, the upper case member 25 has four spaces 29, 30, 31 and 32 which are provided with the following parts corresponding to the aforementioned parts formed in the lower case member.

Namely, a recess 61 contactable with the end of the projection 38 is provided at a position corresponding to the first reference hole 37, while a rectangular recess 62 contactable with the end of the projection 41 is provided at a position corresponding to the oval second reference hole 40. A write protector hole 63, having a smaller area than the write protector hole 44, is provided at a position corresponding to the write protector hole 44 in such a manner as to partially overlap the write protector hole 44. Welding projections 64 having a diameter determined to enable a fit in the first to third welding bosses 39, 42 and 45 are provided at portions corresponding to these welding bosses 39, 42 and 45. Annular welding bosses 65 sized to fit the first and second welding projections 46 and 47 are provided at portions corresponding to these welding projections 46 and 47.

The aforementioned shutter rail, denoted by 66, is formed at the inner side of the front edge C at a position corresponding to the shutter guide rail 51 on the lower case member 24 and in the same configuration as the shutter guide rail 51. A spring retaining notch 68 for retaining one end of a shutter reset spring 67 is formed by recessing the lower case member 24 at a corner near one side of the shutter guide rail 66. Although not shown, the portion of the upper surface of the upper case member 25 is recessed at a region between the front edge C and the adjacent end of the head window 36 so as to provide a connecting recess.

Figure 10:
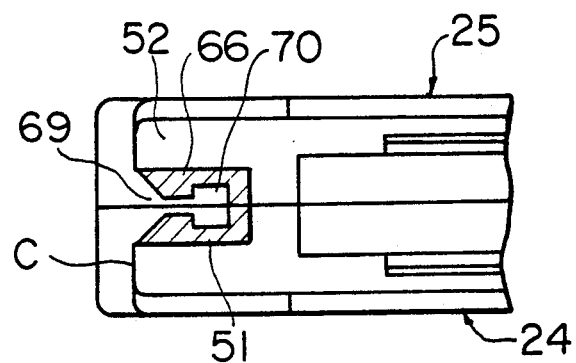
FIG. 10 is a sectional view of an essential part of the disk cartridge of FIG. 5, illustrating the state of adjoining of upper and lower case members.

FIG. 10 is a sectional view of an essential portion of the cartridge case formed by adjoining the lower case member 24 and the upper case member 25 together. When the lower case member 24 and the upper case member 25 are joined together, the shutter guide rails 51 and 66 oppose each other across a slit 69 and a shutter mounting portion 70 is formed on the rear edge of the retaining claw 50.

Figure 11:
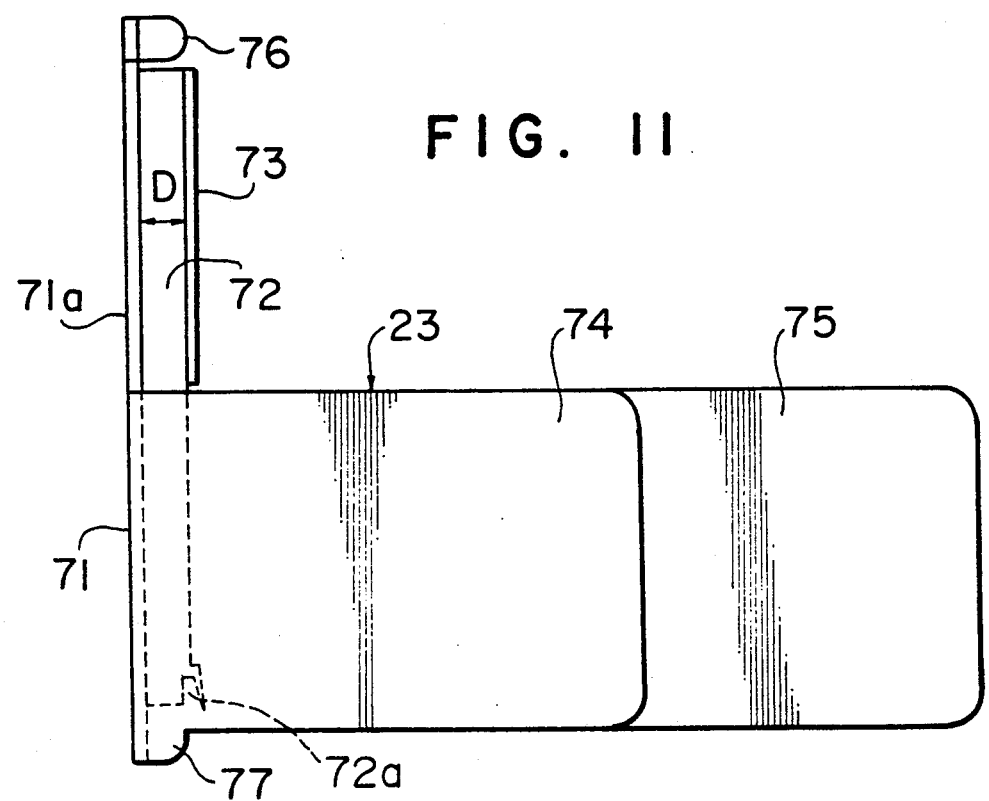
FIG. 11 is a plan view of a shutter used in the disk cartridge of FIG. 5.
Figure 12:
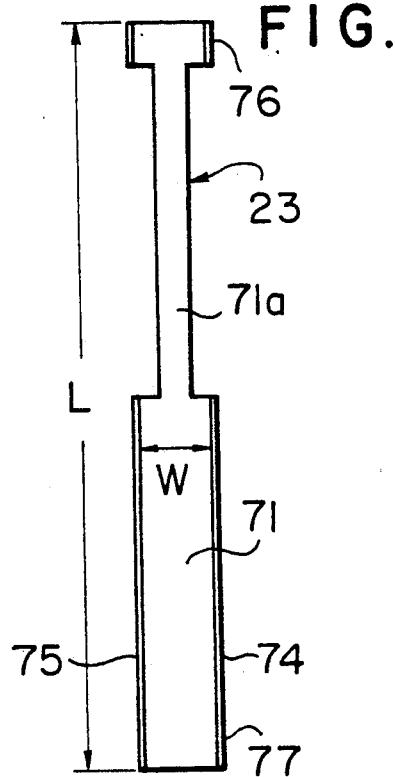
FIG. 12 is a front elevational view of the shutter of the disk cartridge shown in FIG. 5.
Figure 13:
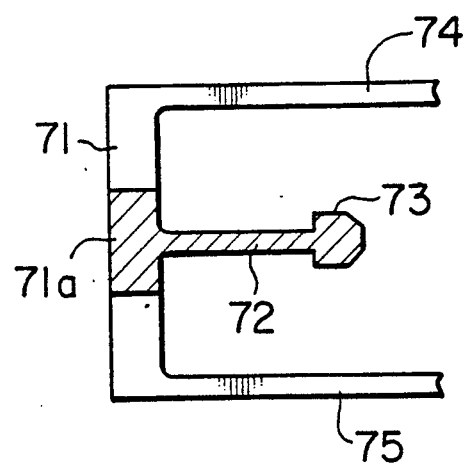
FIG. 13 is a side sectional view of an essential portion of the shutter shown in FIG. 12.

The shutter 23 is made of a predetermined plastic material. As shown in FIGS. 11 to 13, the shutter 23 includes a front part 71 having a width W substantially equal to the thickness of the cartridge case, a narrow part 71a connected to the front part 71, a reinforcement rib 72 formed on the inner side of the front part 71 and the narrow part 71a, a retaining member 73 formed on the end of the reinforcement rib 72, a first shutter panel 74 having a width and length large enough to cover the head window 36, a second shutter panel 75 having a width and length large enough to cover both the head window 36 and the spindle hole 34, and bends 76, 77 formed on both ends of the front part 71.

As will be seen from FIG. 5, the shutter panels 74 and 75 (FIGS. 11–13) are formed at such positions that they close the head window 36 and the spindle hole 34 when the end (bend 76) of the narrow part 71a contacts the internal mounting step 48. The total length L of the front part 71 and the narrow part 71a is determined such that a space necessary for opening the head window 36 and the spindle hole 34 exist between the bend 77 and the actuating step 49 when the bend 76 buts the internal mounting step 48. The narrow part 71a has a width which is substantially the same as the thickness of the connecting recess 52 of the cartridge case 21.

Figure 14:
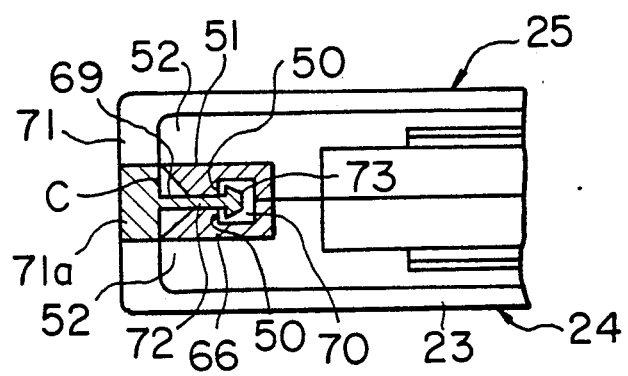
FIG. 14 is a sectional view of an essential portion of the disk cartridge of FIG. 5, illustrating particularly the state of engagement between the cartridge case and the shutter.

The reinforcement rib 72 is formed over the entire length of the front panel 71 and the narrow part 71a. As shown in FIG. 14, the width D (FIG. 11) is determined such that, when the front panel 71 abuts the internal mounting step 48 of the cartridge case 21, the end of the rib 72 is received in a slit 69 formed between the shutter guide rails 51 and 56.

The retainer tab 73 is formed on the portion of the reinforcement rib 72 exposed from the shutter panels 74, 75. The retainer tab 73 is too large it can have any desired length. If the length of the retainer tab 73 will make the insertion into the slit 69 difficult, while if the length is too small this will undesirably facilitate dropping. It is also possible to arrange such that a plurality of short retainer tabs are formed at suitable intervals. It is also possible to extend the retainer tab 73 to the region between the shutter panels 74 and 75.

As will be seen from FIG. 14, the retainer tab 73 has a hook-like form which expands from the reinforcement rib 72 in both directions. It will be seen from this Figure that the retainer tab 73 fits in a mounting portion formed on the rear side of the shutter guide rails 51, 66 so as to engage with the retainer claw 50.

According to this arrangement, the shutter 23 is slidable on the front edge C of the cartridge case 21 along the shutter guide rails 51 and 66.

A description will be given hereinunder as to the method of assembly of this embodiment of the disk cartridge.

The disk 22 is placed in the disk receiving portion 28 of the lower case member 24 such that the hub 33 provided on the center of the disk 22 is exposed through the central hole 34.

Subsequently, the upper case member 25 is brought into contact with the lower case member 24 such that the abutting surface 26a of the joint wall 26 on the lower case member 24 contacts the abutting surface 26a of the joint wall 26 on the upper case member 25, with the welding bosses 39, 42, 45 and 65 of the lower and the upper case members 24, 25 fitting on corresponding welding projections 64, 46, and 47. In this state, the welding bosses 39, 42, 45 and 65 and the welding projections 64, 47 and 46 are welded together at their fitting regions by means of supersonic wave.

Then, the shutter 23 is inserted from the front side of the cartridge case 21 while deforming the shutter 23 such that the free ends of the shutter panels 74 and 75 are slightly moved apart from each other. In this state, the shutter 23 is pressed with its retainer tab 73 fitting in the slit 69 in the front edge C of the disk cartridge 21. In consequence, the retainer tab 73 is elastically deformed and, at the same time, the cartridge case 21 composed of the lower case member 24 and the upper case member 25 is elastically deflected mainly at the connecting recesses 52, so that the retainer tab 73 is forced into the mounting portion 70 through the slit 69 formed between the shutter guide rails 51 and 66. In consequence, shutter 23 and the cartridge case 21 are connected integrally so that the shutter 23 can freely slide along the shutter guide rails 51 and 66 without coming off or disengaging.

Finally, a spring member 67 such as a torsion coiled spring is inserted into the cartridge case 21 through the slit 69. At the same time, the spring member 69 is retained at its one end on a spring retainer 72a (FIG. 11) formed on the shutter 23 while the other end of the same is retained by the spring retainer 68 formed on the upper case member 25, and the shutter 23 is set at a position where it closes the head windows 36.

Figure 15A:
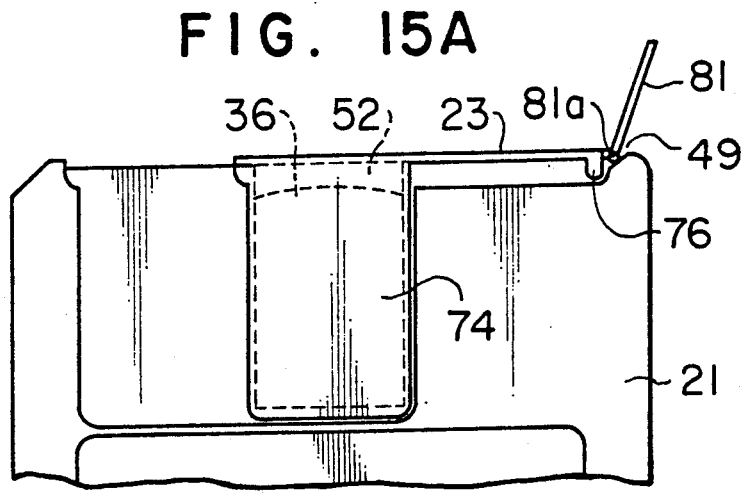
FIGS. 15A and 15B are plan views of essential portion of the disk cartridge of FIG. 5, illustrating the operation of the shutter.
Figure 15B:
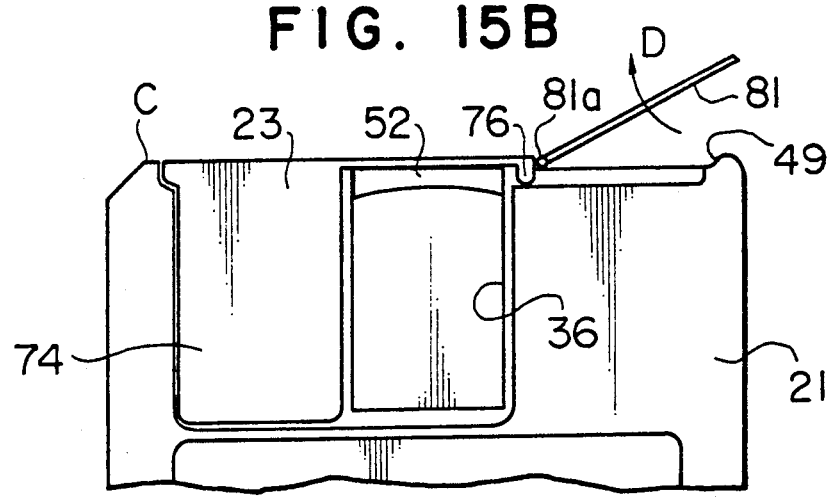

A description will be given of the opening/closing motion of the shutter 23. As the disk cartridge 21 is inserted into the disk drive, the end 81a of the shutter actuator arm 81 provided in the disk drive is inserted into an actuating step 49, as will be seen from FIG. 15A.

As the disk cartridge 21 is inserted deeper, the shutter actuating arm 81 is rotated in the direction of an arrow D against the force of the spring member 67, so that the end 81a of the arm 81 moves in the shutter opening direction along the front edge C of the cartridge case 21.

In consequence, the head windows 36 and the spindle hole 34 formed in the disk cartridge are opened.

In ejecting the disk cartridge 21, as the disk cartridge 21 is pulled out from the disk drive, the shutter actuating arm 81 is operated such that its end 81a is moved along the front edge C of the disk cartridge 21 back to the actuating step 49.

As a result, the shutter 23 is moved in the closing direction by the resilient force of the spring member 67 and is finally set in the original position where it covers again the spindle hole 34 and the head windows 36.

The disk cartridge 21 of this embodiment has a high mechanical strength of the shutter system by virtue of the reinforcement rib 72 formed on the inner surfaces of the front part 71 and the narrow part 71a of the shutter 23. The reinforcement rib 72 provides a rigidity which is large enough to prevent deformation or breakage of the shutter 23 even when an extraordinary external force is applied during the operation of the shutter 23. Furthermore, this embodiment of the disk cartridge 21 exhibits a reduced tendency of swelling due to water or moisture absorption, as well as smaller change in shape according to elape of time. Furthermore, since the strength is improved at the narrow part 71a, the practical utility of the shutter 23 is enhanced particularly when the shutter 23 is used on a cartridge case of the type having a connecting recess 52, as in the case of the described embodiment.

It is also to be noted that the bends 76 and 77 formed on both ends of the front part 71 of the shutter 23 ensures safe engagement of the shutter actuating arm 81.

In addition, since a connecting recess 52 is formed in the surface of the disk cartridge case 21 in the region between the front edge C and the head window 36, it is not necessary to move the recording/read-out head vertically relative to the disk when the same makes access to the disk for the purpose of recording or read-out, whereby the driving and control system of the disk drive are simplified and the thickness of the disk drive is reduced.

Although the described embodiment makes use of a single-sided disk or a magneto-optical disk which is used in a cartridge which has a spindle hole only in one side thereof, this is not exclusive and the invention can equally be applied to a double-sided disk cartridge in which are spindle holes are formed both in the upper and lower case members of the disk cartridge case.

In the described embodiment, the shutter is designed to move only in one direction from the head opening closing position. This is only illustrative and, in the case of a double-sided disk cartridge, the shutter may be designed such that it moves in both directions from the head window closing position.

It is also to be noted that the narrow part of the shutter connected to the front part of the shutter may be omitted, although the described embodiment employs such a narrow part.

Furthermore, two shutter panels of the shutter may have an equal length, although in the described embodiment the shutter panels have different lengths.

It will be clear to those skilled in the art that the disk cartridge of this embodiment can be used for encasing various disk-type recording mediums such as a magnetic disk, optical disk and so forth.

Figure 16:
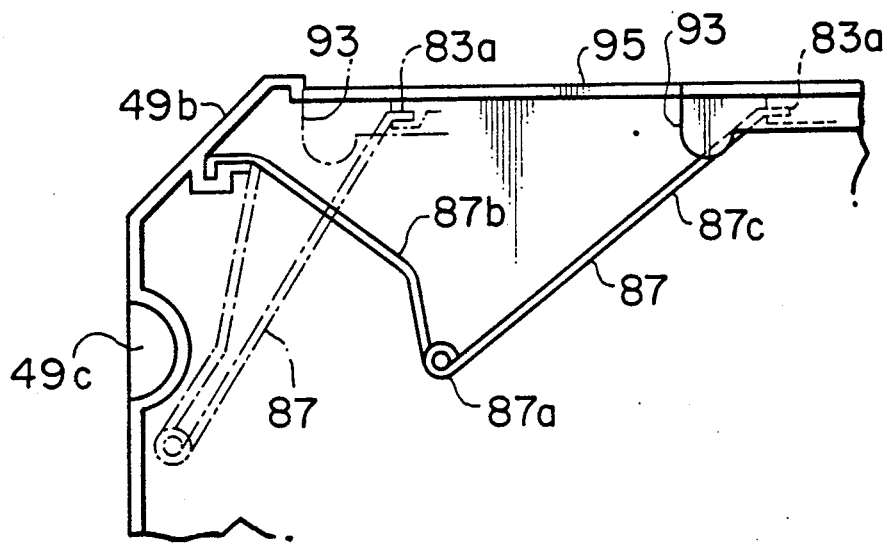
FIG. 16 is a plan view of an inner surface of a case member of a third embodiment of the disk cartridge in accordance with the present invention.

A third embodiment of the present invention will be described with reference to FIGS. 16 to 18. As will be seen from these Figures, the reset spring 87 in a disk cartridge employs a so-called torsion coiled spring which has a coil portion 87a and two arms 87b, 87c extending from the coil portion 87a. The arm 87b, which is disposed adjacent to the recess 49c (FIG. 16), is bent at its intermediate portion as shown in FIG. 17. This arm 87b has a length $l_1$ which is smaller than the length $l_2$ of the other arm 87c. The bend of the arm 87b is formed at such a position that it confronts the recess 49c when the arm 87b is held on a spring retainer formed in the upper case member 95 while the other arm 87c engages with the spring retainer 83a on the shutter.

In this embodiment of the present invention, one of two arms 87b which extend from the coil portion 87a of the torsion spring 87 adjacent to the recess 49c formed in the cartridge case 1 is bent at an intermediate portion thereof so that collision or contact between the arm 67b and the recess 49c is avoided when the shutter is opened, whereby the shutter can open and close smoothly.

Furthermore, since one of the arms 87b has a length $l_1$ which is smaller than the length $l_2$ of the other arm 87c, it is possible to form a slant surface, and it can be set in a restricted space where the slant surface 49b for discrimination between the side A and the side B of the disk is provided.

In this embodiment, one of the arms 87b of the torsion spring 87 has a length $l_1$ which is Smaller than the length $l_2$ of the other arm 87c. This, however, is only illustrative and both arms may have an equal length when the torsion spring 87 is used in a disk cartridge in which the tapered surface 49b for discrimination between the side A and the side B is not provided.

This embodiment is characterized by a specific form of the reset spring. This specific form of the torsion spring 87 can be applied, therefore, to various types of cartridge cases and shutters.

For instance, though a disk cartridge having a spindle hole only in one side of the disk cartridge for use with a single-sided recording disk or optical disk has been described, the arrangement explained can be applied to a double sided disk cartridge having spindle holes both in the lower case member and the upper case member.

It is also to be understood that the shutter may be designed to move only in one direction from the head window closing position, or the shutter may be designed to move in both directions from the head window closing position in the case of a double-sided disk cartridge.

It is also to be noted that the narrow part of the shutter connected to the front part of the shutter may be omitted, although the described embodiment employs such a narrow part.

Furthermore, two shutter panels of the shutter may have an equal length, although in the described embodiment the shutter panels have different lengths.

It will be clear to those skilled in the art that the disk cartridge of this embodiment can be used for encasing various disk-type recording mediums such as a magnetic disk, optical disk and so forth.

FIG. 19 shows a fourth embodiment of the disk cartridge of the present invention which has been inserted into an information reading apparatus in a wrong posture, i.e., in an upside down posture. FIG. 20 shows the detail of the portion E of the disk cartridge case shown in FIG. 19.

Referring to FIGS. 19 and 20, an information recording disk 22, such as a magnetic disk or an optical disk is mounted in a disk cartridge which is generally denoted by 1. The disk cartridge case 1 has a shutter 93 having a front edge which is asymmetrical with respect to the direction a of insertion. Numerals 4 and 2 denote openings and windows formed in the disk cartridge case 1 for the purpose of allowing a motor spindle (not shown) and an information reading head (not shown) to make access to the disk 22. The information reading apparatus 100 has a lever 101 for opening the shutter 93, while 102 denotes a spring. A reference 8b denotes the front edge of the disk cartridge case which is adapted to be contacted with the lever 101 when the disk cartridge case 1 has been correctly set in the information reading apparatus 100. A numeral 8 denotes a stopper in the form of a recess which is formed in the opposite portion of the front edge 1a of the disk cartridge case 1 to the lever contact position 8b. When the disk cartridge case 1 is inserted into the information reading apparatus 100 in the wrong posture, as shown in FIG. 19, the lever 101 is engaged with the stopper 8 in the form of a recess provided in the front edge 1a of the disk cartridge case 1 so as to resist to the insertion of the cartridge case 1, thus preventing further insertion of the disk cartridge case 1.

The operation performed by the apparatus when the disk cartridge case 1 is correctly inserted into the information reading apparatus 100 will be described with reference to FIGS. 21 and 22. In these Figures, the same reference numerals are used to denote the same parts or members as those appearing in FIGS. 19 and 20. A numeral 2 denotes a head window formed in the disk cartridge case 1 for allowing access of an information reading head, while a numeral 93a designates an opening formed in the shutter 93. As the disk cartridge case 1 is inserted into the information reading apparatus 100, as indicated by an arrow a, the lever 101 moves laterally while maintaining contact with the front edge 1a of the disk cartridge case 1. As a result of the operation of the lever 101, the shutter 93 is urged in the direction d so as to slide until the opening 93a in the shutter 93 is brought into alignment with the head window 2 of the disk cartridge case 1.

Figure 23A:
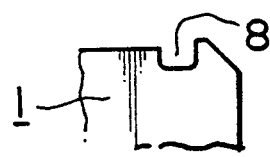
FIGS. 23A, 23B, 23C, 23D, 23E and 23F are illustrations of modifications of the stopper in FIGS. 19 and 20.
Figure 23D:
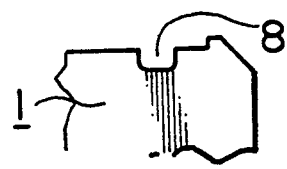
Figure 23B:
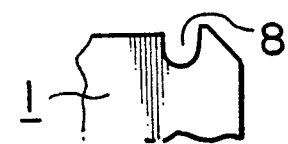
Figure 23E:
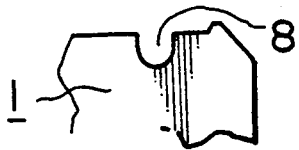
Figure 23C:
Figure 23F:
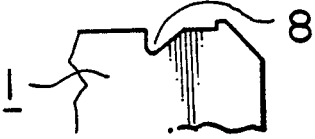

FIGS. 23A to 23F show modifications of the recessed stopper 8 shown in FIGS. 19 and 20. The arrangements shown in FIGS. 23D, 23E and 23F are different from the arrangements of FIGS. 23A, 23B and 3C in that the stopper 8 is provided closer to the center of the cartridge disk case 1. These stoppers 8, however, are only illustrative and any suitable construction or configuration capable of preventing motion of the lever 101 of the information reading apparatus 100 can be used. The described construction of the information reading apparatus should be also considered as being illustrative.

A fifth embodiment of the disk cartridge in accordance with the present invention will be described with reference to the perspective view of FIG. 24. As will be seen from this Figure, the disk cartridge of this embodiment has a cartridge case 1 made of a plastic, a disk-type recording medium 22 rotatably encased by the cartridge case 1, a shutter 23 provided on the cartridge case 1 for sliding movement along the front edge of the cartridge case, and a write protector 150 in the cartridge case 1.

Figure 24:
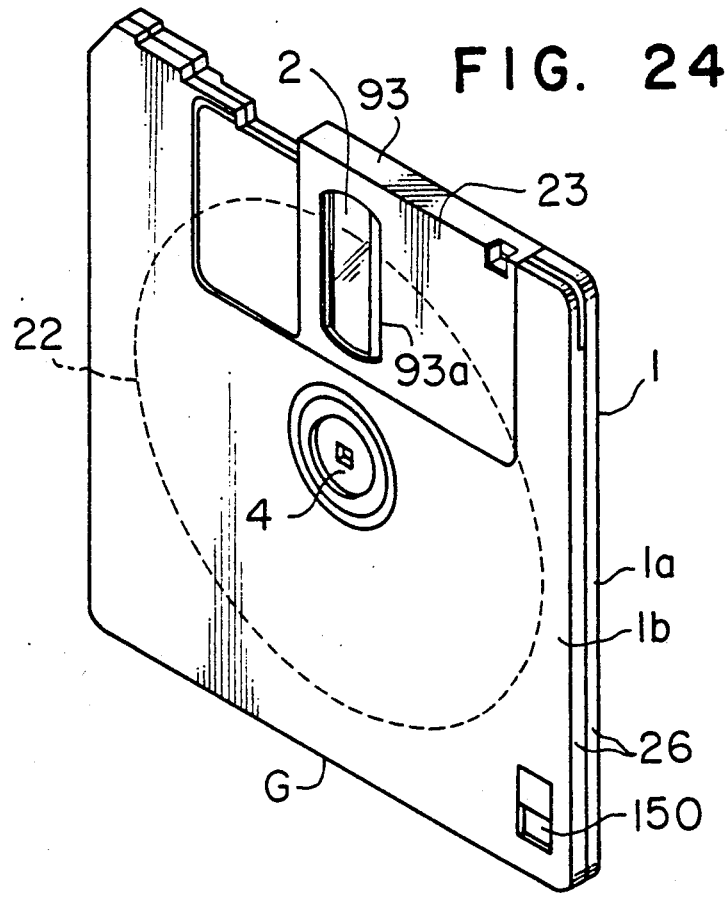
FIG. 24 is a perspective view of a fifth embodiment of the disk cartridge in accordance with the present invention.

As will be seen from FIG. 24, the cartridge case 1 is composed of an upper case member 1a and a lower case member 1b.

Each of the upper and lower case members 1a and 1b has a shallow pan-like construction with a peripheral joint wall 26 of a substantially constant height formed on its inner surface. A spindle hole 4 is formed in the substantially central portion of at least one of the upper and lower case members 1a and 1b. A head window 2 which extends in the radial direction of the disk 22 is formed in the portion of the case member between the spindle hole 4 and the front edge (leading edge as viewed in the direction of insertion to the disk drive apparatus) of the disk cartridge case 1.

The shutter 23 is formed by bending a thin sheet of, for example, a metal such as to provide a substantially U-shaped cross-section. The shutter 23 is slidably attached to the front edge of the disk cartridge case 1 and shaped and sized such that it completely closes the head window 2 when the disk cartridge is not used and completely opens the head window when the disk cartridge is inserted into the disk drive.

Figure 25:
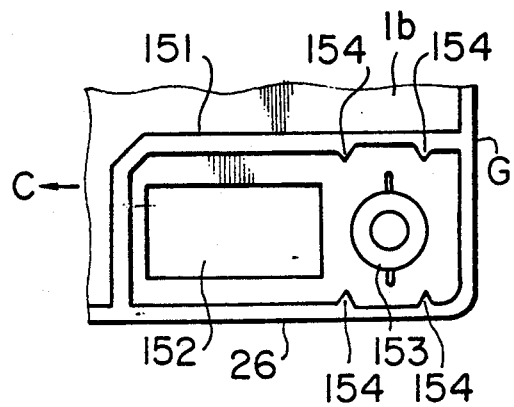
FIG. 25 is a plan view of an essential portion of an inner face of the lower case member.

As will be seen from FIG. 25, a frame 151 of the same height as the joint wall 26 is formed on the inner surface of the lower case member 1b in such a manner as to surround the corner of the rear edge G of the disk cartridge case 1. An elongated hole 152 is formed in a portion of the region surrounded by the joint wall 26 and the frame 151 and at a side near the front edge C, while a connecting boss 153 is formed to protrude from a portion of the above-mentioned region adjacent to the rear edge G. A pair of opposing projections 154 are formed on portions of the joint wall 26 and the frame 151 extending along the side surfaces of the lower case 1b. These projections 154 are intended for holding the write protector at a constant position and for imparting a feel of click to the write protector during the operation.

Figure 26:
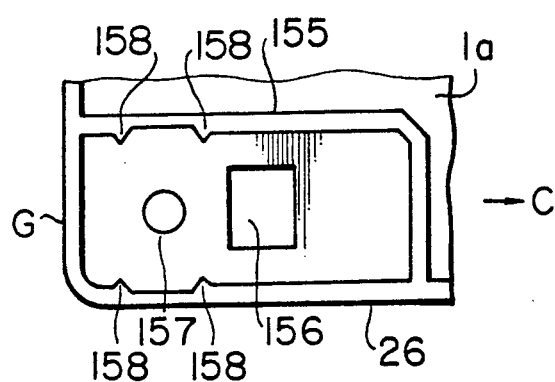
FIG. 26 is a plan view of an essential portion of an inner face of the upper case.
Figure 27:
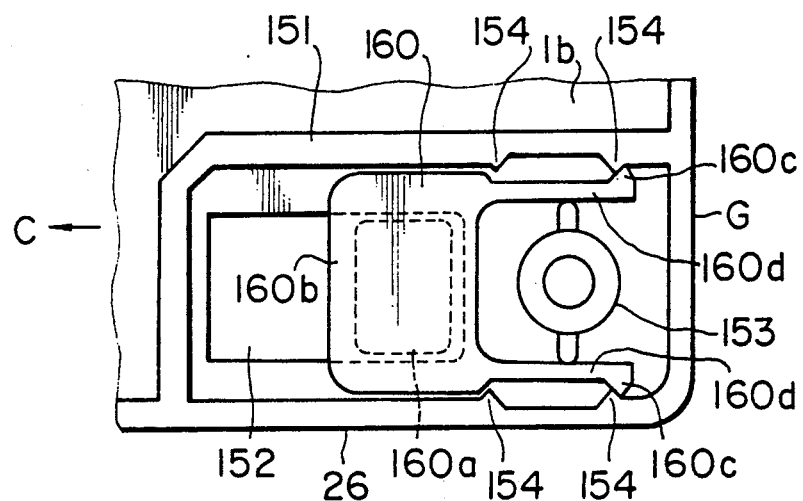
FIG. 27 is a plan view of an essential portion of an inner face of the fifth embodiment, with an upper case member removed to show the state of mounting of a lower case member and a light protector.
Figure 28:
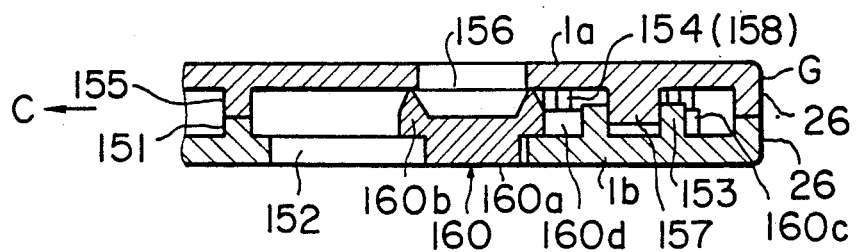
FIG. 28 is a sectional view of an essential portion of the fifth embodiment showing particularly a portion for mounting the write protector.

As shown in FIG. 26, the upper case member 1a is provided with a frame 155 at a portion thereof corresponding to the frame 151 formed on the lower case 1b. A small hole 156 is formed at a position corresponding to a position in the region defined by the joint wall 26 and the frame 155, and corresponding to a position near an end of the elongated hole 152 adjacent to the rear edge G. A connecting projection 157, sized to just fit in the connecting boss 153, is formed at a position corresponding to the connecting boss 153. Projections 158, of the same size and shape as the projections 154 on the lower case member 1b, are formed on the inner surfaces of the joint wall 26 and the frame 155 at positions corresponding to these projections 154.

The disk cartridge, when designed for use with a 3.5 inch disk, has an overall thickness of 3 mm. Bottom walls of the case member 1a and the lower case member 1b have an equal thickness of 0.6 mm. The connecting boss 153 and the connecting projection 157 are formed at a position which is spaced 5 mm both from the side edge and the rear edge G of the disk cartridge case, while the elongated hole 152 is formed at a point which is spaced 5 mm from the side edge of the disk cartridge case 1, and 11 mm from the rear edge G of the same.

The disk cartridge, when designed for use with a 5 inch disk, has an overall thickness of 11 mm. Bottom walls of the member 1a and the lower case member 1b have an equal thickness of 1.5 mm. The connecting boss 153 and the connecting projection 157 are formed at a position which is spaced 7.5 mm from the side edge and 6.5 m from the rear edge G of the disk cartridge case while the elongated hole 152 is formed at a point which is spaced 7.5 mm from the side edge of the disk cartridge case 1 and 15 mm from the rear edge G of the same.

In the assembly, the connecting projections 157 formed on the upper case member 1a are inserted into the connecting bosses 153 on the lower case member 1b, so that the upper case member 1a and the lower case member 1b are correctly located with respect to each other. These case members are then united with each other by supersonic welding at the fitting portions of the connecting bosses 153 and the connecting projections 157, whereby a space is defined between the upper case member 1a and the lower case member 1b for accommodating the disk 22, write protector 150 and other components.

The write protector 160 may be of the same shape as that used in the conventional arrangement.

The write protector 160 has a panel portion 160b and legs 160d movably disposed in a space defined by the upper case member 1a, lower case member 1b, joint wall 26 and the frames 151 and 155 with the legs 160d directed towards the rear edge G of the disk cartridge case. The write protector 160 is accommodated in the disk cartridge case 1 with the manipulating portion 160a formed on the panel portion 160b received in the elongated hole 152 formed in the lower case member 1b. It is therefore possible to externally operate the write protector 160 through manipulation of the manipulating portion 160a.

More specifically, when the manipulating portion 160a, or the flap portion 160b, is moved to the stroke end closer to the rear edge G of the disk cartridge case 1, the panel portion 160b closes the small hole 156 formed in the upper case member 1a, thus informing that the disk cartridge 1 is now set in the writing operation mode. In this state, the retainer claws 160c formed on the ends of the legs 160d engage with the projections 154 and 158 formed on portions of the upper and lower case members 1a, 1b adjacent to the rear edge G, so that the write protector 160 is held at this position unless an external force which would overcome the resiliency of the legs 160d is applied thereto.

When the manipulating portion 160a is urged towards the front edge C of the disk cartridge 1, the legs 160d are deflected inwardly so as to be disengaged from the projections 154 and 158. When the panel portion 160b has been moved to the stroke end adjacent to the front edge C of the disk cartridge case 1, the small hole 156 is opened so as to inform that the disk cartridge case is in a state which forbids writing. During the stroking of the write protector 160, the engagement and disengagement between the legs 160d and the projections 154, 158 impact a feel of click to the user, thereby ensuring safe operation of the write protector.

In the disk cartridge of the described embodiment, the distance between the joint portion and the rear free edge of the disk cartridge is small so that a remarkable improvement in the rigidity is attained in the rear edge G of the disk cartridge case. This improved rigidity eliminates troubles such as undesirable opening or separation of the upper and lower case members at the rear edge G of the disk cartridge case, even if a rather extraordinarily large force is applied to the write protector during the operation of the write protector or by a collision with a solid foreign matter. It is therefore possible to avoid problems such as an accidental drop of the write protector from the disk cartridge case.

This embodiment has a critical feature that the connecting members, i.e., bosses and projections, are provided on the corners of the upper and lower case members adjacent to the rear edge of the disk cartridge case, with the write protector provided on the front side of these connecting members. Thus, the shapes, numbers and materials of the write protector, write protector hole, spindle hole, head window and the shutter described hereinbefore are only illustrative, as well as the materials of these parts.

For instance, though the described embodiment employs only one write protector, this is only illustrative and the disk cartridge can have two write protectors for two sides A and B of the disk when the disk is a double-sided disk. Needless to say, the described embodiment of the disk cartridge of the invention can be used for various types of known recording mediums such as optical recording mediums and magnetic recording mediums, as well as magnetooptic mediums. It is also to be understood that the shutter 3 or the like may be constructed to selectively close only the head windows 2a, 2b or the like, without closing the hub hole 4 or the like. In addition, the arrangement may be such that the narrower head window is formed in the upper case member, since the invention requires that either one of the head windows has a width smaller than that of the other. Which one of the head windows has the narrower width is a matter of design choice which can be considered depending on factors such as the construction of the disk drive on which the disk cartridge is to be used.

As has been described, according to the present invention, the risk for the disk in the disk cartridge to be contaminated with dust and greasy matter on fingers is diminished by virtue of the improvement which is achieved by such a design that one of the head window formed in the upper case member and the head window formed in the lower head window has a width smaller than that of the other, thus contributing to an improvement in the reliability of the recording medium. In addition, play or rattle of the shutter is prevented and the mechanical strength of the shutter system is enhanced advantageously.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disk cartridge accommodating an optical disk adapted to be used on an optical recording/read-out apparatus having at least one small head for making access to one side surface of said optical disk and at least one large head, larger in size than said small head, for making access to another side surface of said optical disk, said optical disk cartridge comprising:

a pair of case members including an upper case member and a lower case member which are assembled together to form a case defining therein an internal space for accommodating said optical disk; said pair of case members having head windows therein in such a manner as to oppose each other for allowing said at least one small head and at least one large head to make access to said optical disk therethrough, said head windows extending in a predetermined radial direction of said optical disk, one of said head windows for allowing access of said small had having a width smaller than that of a head window allowing access of said large head, each of said case members having a recess with a width substantially the same as that of an associated window in an outer surface thereof over a region extending between one longitudinal end of said associated head window and an edge of said case member closest to said one longitudinal end of said head window so as to allow a loading/unloading of said cartridge into/out of said optical recording/read-out apparatus through a gap between said small and large heads thereof; and a shutter capable of sliding on said case in a widthwise direction of said head windows so as to open/close said recesses and said head windows.

2. An optical disk cartridge according to claim 1, wherein said optical disk comprises a magneto-optical disk and said head windows of said case members accommodate as a small head a optical head and as a large head a magnetic head.

3. An optical disk cartridge according to claim 1, wherein only one of said upper case member and said lower case member of said pair of case members has an opening for a spindle.

4. An optical disk cartridge according to claim 2, wherein said one case member having said head window for accessing said optical head has a groove in an outer surface thereof along either side of said recess for guiding said shutter.

* * * * *